(12) United States Patent
Trickett

(10) Patent No.: US 7,152,733 B2
(45) Date of Patent: Dec. 26, 2006

(54) SPRING-LOADED FOLDING GRILL COVER DEVICE

(75) Inventor: James R. Trickett, Euclid, OH (US)

(73) Assignee: Harmon Industries, LLC, Euclid, OH (US)

( * ) Notice: Subject to any disclaimer, the term of this patent is extended or adjusted under 35 U.S.C. 154(b) by 579 days.

(21) Appl. No.: 10/305,757

(22) Filed: Nov. 26, 2002

(65) Prior Publication Data

US 2003/0196562 A1    Oct. 23, 2003

Related U.S. Application Data

(60) Provisional application No. 60/373,971, filed on Apr. 19, 2002.

(51) Int. Cl.
*B65D 65/02* (2006.01)
(52) U.S. Cl. ............. 206/320; 150/154; 150/165; 135/126
(58) Field of Classification Search ......... 150/154, 150/165; 383/2; 135/126; 99/482; 52/79.5; 206/320

See application file for complete search history.

(56) References Cited

U.S. PATENT DOCUMENTS

| | | | | |
|---|---|---|---|---|
| 2,474,031 A | * | 6/1949 | Burns | 114/361 |
| 2,683,507 A | | 7/1954 | Coven | |
| 2,731,972 A | * | 1/1956 | Braun | 135/125 |
| 3,675,667 A | * | 7/1972 | Miller | 135/126 |
| 4,825,892 A | * | 5/1989 | Norman | 135/126 |
| 4,858,634 A | * | 8/1989 | McLeese | 135/126 |
| 5,038,812 A | * | 8/1991 | Norman | 135/126 |
| 5,245,801 A | | 9/1993 | Boesvert | |
| 5,301,705 A | | 4/1994 | Zheng | |
| 5,370,145 A | * | 12/1994 | Wu | 135/127 |
| 5,467,794 A | | 11/1995 | Zheng | |
| 5,579,799 A | | 12/1996 | Zheng | |
| D377,136 S | | 1/1997 | Knuth | |
| 5,737,880 A | | 4/1998 | Hayes et al. | |
| 5,816,954 A | | 10/1998 | Zheng | |
| 5,970,661 A | | 10/1999 | Bishop | |
| 6,058,658 A | | 5/2000 | Dunn | |

(Continued)

FOREIGN PATENT DOCUMENTS

JP    403021779 A  *  1/1991  ............. 135/126

OTHER PUBLICATIONS

Outdoor Innovations Ltd. QUICKDRAW Self-Erecting Tents, Beach Comber Designed for Backpacking brochure.
Glastic Corporation, Engineering Solutions, "Find Out How Glastic's Other Fiberglass-Reinforced Polyester Solutions Can Help You" brochure, 1998.
Playhut Hide Away™ Play Structure instructions, 1999.

*Primary Examiner*—Sue A. Weaver
(74) *Attorney, Agent, or Firm*—Fay, Sharpe, Fagan, Minnich & McKee LLP

(57) ABSTRACT

A grill cover device includes a flexible cover defining a hollow recess having an open mouth. The recess is adapted to receive an associated grill therein when the flexible cover is in an expanded condition. A flexible resilient frame is connected to the flexible cover. The frame exerts a biasing force on said flexible cover to bias the cover into its expanded condition. The frame and the flexible cover are selectively resiliently deformable as a unit against the biasing force of the frame into a collapsed storage configuration in which the frame and cover are folded upon themselves.

1 Claim, 6 Drawing Sheets

U.S. PATENT DOCUMENTS

| | | |
|---|---|---|
| 6,073,283 A | 6/2000 | Zheng |
| 6,328,083 B1 | 12/2001 | Esterson et al. |
| D461,994 S | 8/2002 | Hung |
| D466,752 S | 12/2002 | Rowe |
| 6,506,471 B1 | 1/2003 | Doppelt |
| 6,651,685 B1 * | 11/2003 | Connelly et al. ........... 135/117 |
| 6,848,460 B1 * | 2/2005 | Zheng ........................ 135/126 |
| 2002/0179211 A1 | 12/2002 | Neal |

* cited by examiner

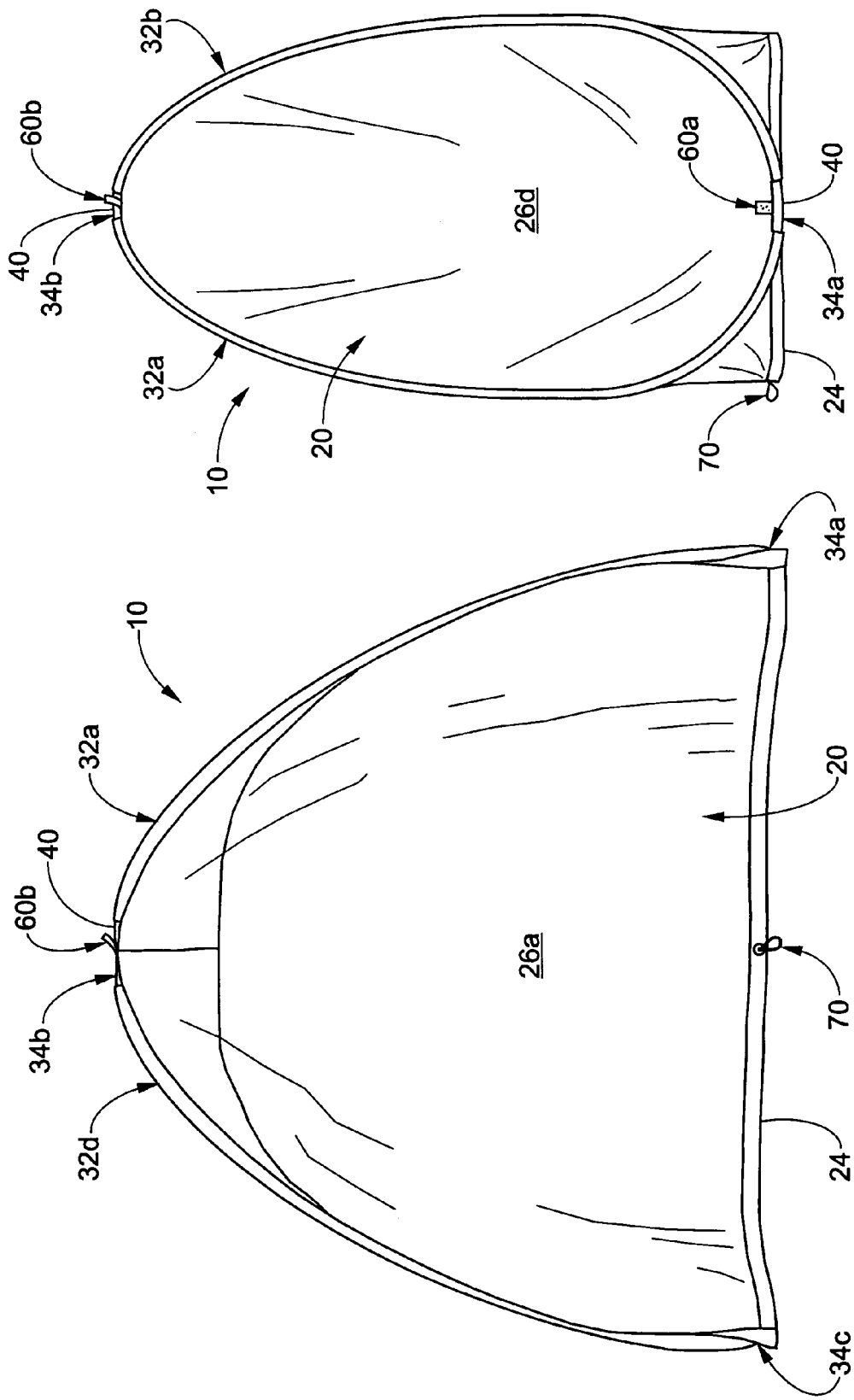

SPRING-LOADED FOLDING GRILL COVER DEVICE

CROSS-REFERENCE TO RELATED APPLICATION

This application claims benefit of the filing date and priority from U.S. provisional application No. 60/373,971 filed Apr. 19, 2002.

BACKGROUND OF THE INVENTION

Grill covers are well-known and in widespread use. Conventional grill covers are generally effective for covering and protecting grills, but are undesirable for many reasons. For example, conventional grill covers are often difficult to deploy owing to their lack of supporting frame structure. A user is often unable to determine the correct orientation of the cover in order to place it over the grill, and the limpness of these prior covers inhibits sliding placement of the cover over the grill. Secondly, conventional grill covers are difficult and unsightly to store when not in use. Most users simply roll these covers in a ball or drape same over a lawn chair etc. Another disadvantage associated with conventional grill covers is that the cover, itself, is not stretched taut during use. This leads to the formation of pockets and folds in the cover that collect water, leaves and dirt and that can lead to mold or mildew growth and the like.

In light of the foregoing deficiencies and others associated with conventional grill covers, a need has been identified for a novel and unobvious grill cover device that overcomes the noted deficiencies and others while providing better overall results.

SUMMARY OF THE INVENTION

In accordance with a first aspect of the present invention, a grill cover device includes a flexible cover defining a hollow recess having an open mouth. The recess is adapted to receive an associated grill therein when the flexible cover is in an expanded condition. A flexible resilient frame is connected to the flexible cover. The frame exerts a biasing force on said flexible cover to bias the cover into its expanded condition. The frame and the flexible cover are selectively resiliently deformable as a unit against the biasing force of the frame into a collapsed storage configuration in which the frame and cover are folded upon themselves.

In accordance with another aspect of the present invention, a grill cover device comprises a flexible covering member and a resilient frame member connected to the flexible covering member. The resilient frame member and flexible covering member connected thereto are selectively resiliently expandable as a unit into an expanded condition where the flexible covering member defines a shell including a recess and an open mouth.

In accordance with still another aspect of the present invention, a grill cover comprises a cover adapted to be placed in covering relation over an associated grill. A spring frame substructure is connected to the cover for holding the cover in an expanded condition.

BRIEF DESCRIPTION OF THE DRAWINGS

The invention comprises various components and arrangements of components, and comprises various steps and arrangements of steps, preferred embodiments of which are illustrated in the accompanying drawings that form a part hereof and wherein:

FIG. 2 is front elevational view of the spring-loaded folding grill cover device shown in FIG. 1;

FIG. 3 is a side elevational view of the spring-loaded grill cover device shown in FIG. 1;

DETAILED DESCRIPTION OF PREFERRED EMBODIMENTS

Figure 1:
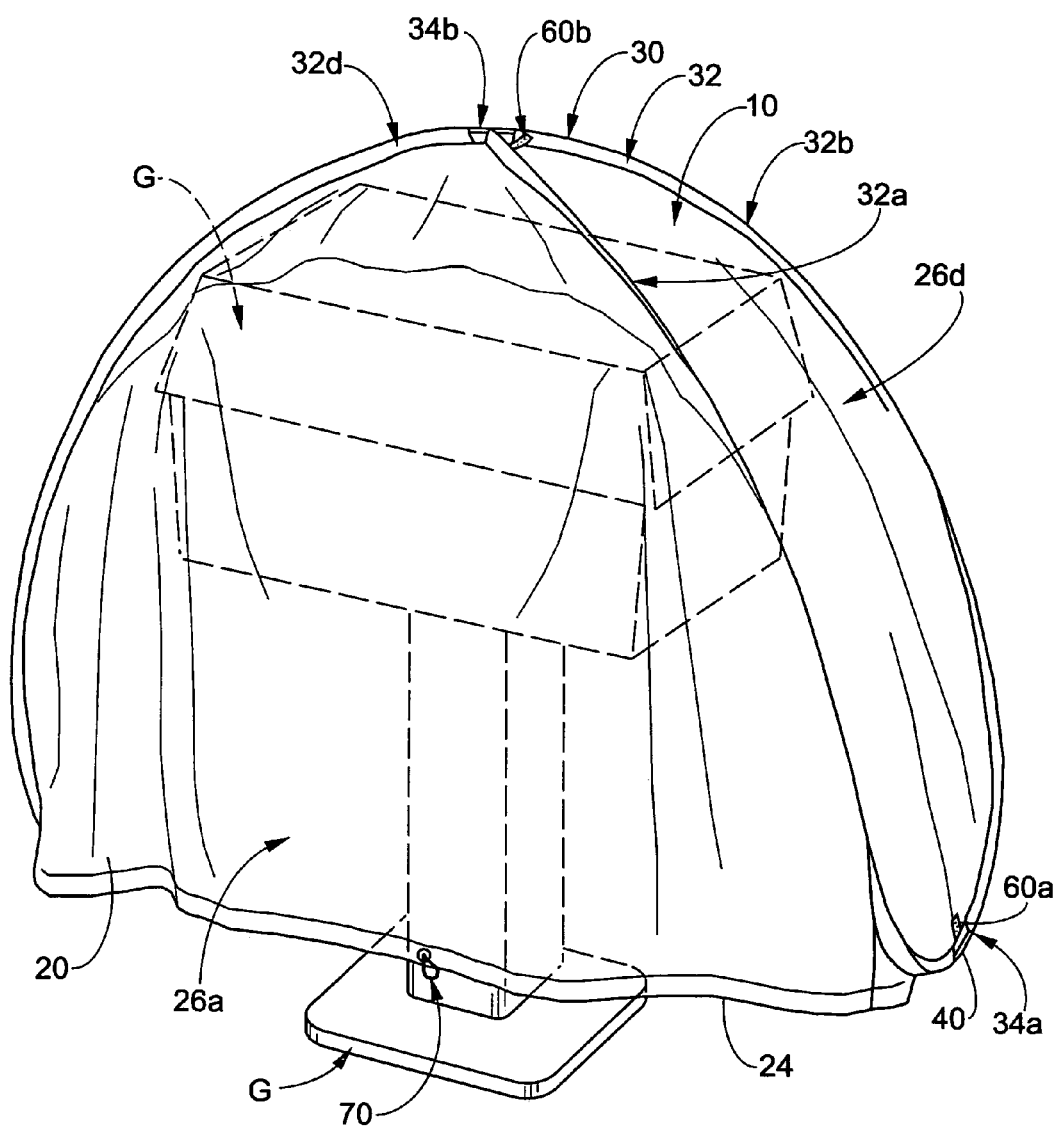
FIG. 1 is a perspective view of a spring-loaded folding grill cover device formed in accordance with the present invention and showing an associated grill that does not form part of the present invention.
Figure 4:
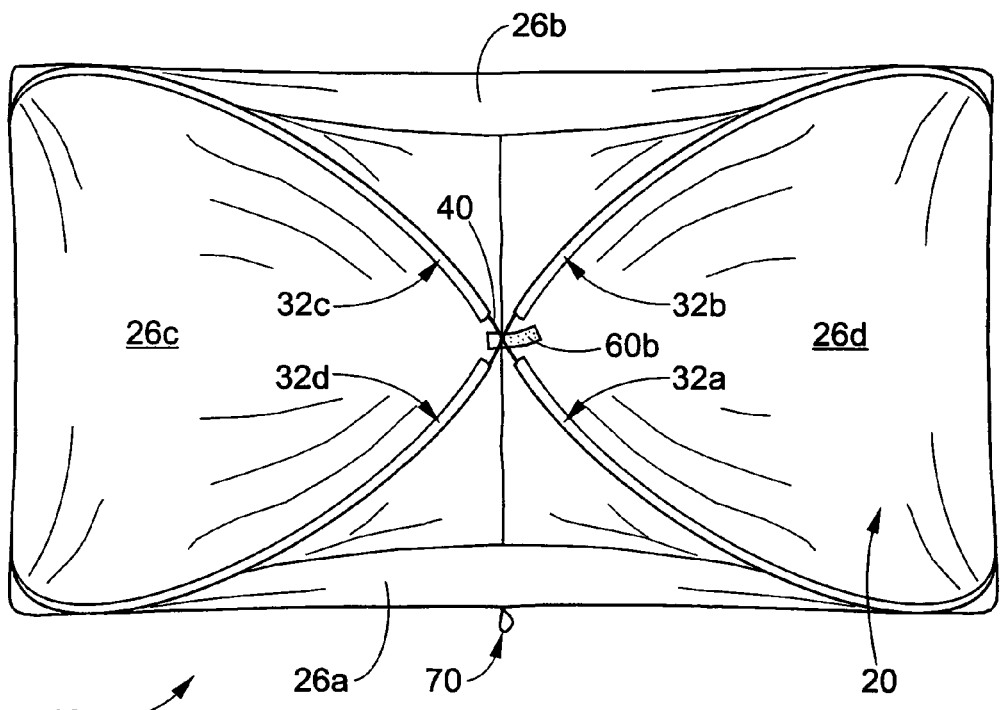
FIG. 4 is a top plan view of the spring-loaded folding grill cover device shown in FIG. 1.

Referring now to the drawings, which are for purposes of illustrating the preferred embodiment only and are not to be used to limit the invention in any way, FIG. 1 illustrates a spring-loaded folding grill cover device 10 formed in accordance with the present invention and operatively employed to cover an associated grill G such as a gas or charcoal grill used for cooking. The illustrated grill G is only one example of an associated grill G that can be covered by a spring-loaded folding grill cover device 10 formed in accordance with the present invention. In some cases the associated grill G will include a table or the like connected thereto, and the spring-loaded folding grill cover device 10 can be used to cover such a grill/table combination.

The spring-loaded folding grill cover device 10 comprises a water-proof or at least water-resistant flexible cover 20 preferably defined from one or more sections of natural and/or polymeric materials or the like such as Nylon, polyester, polyvinyl chloride (PVC), treated canvas, rubberized fabrics, plastic sheet material, or any other flexible sheet material such as that used on prior grill covers.

Figure 5:
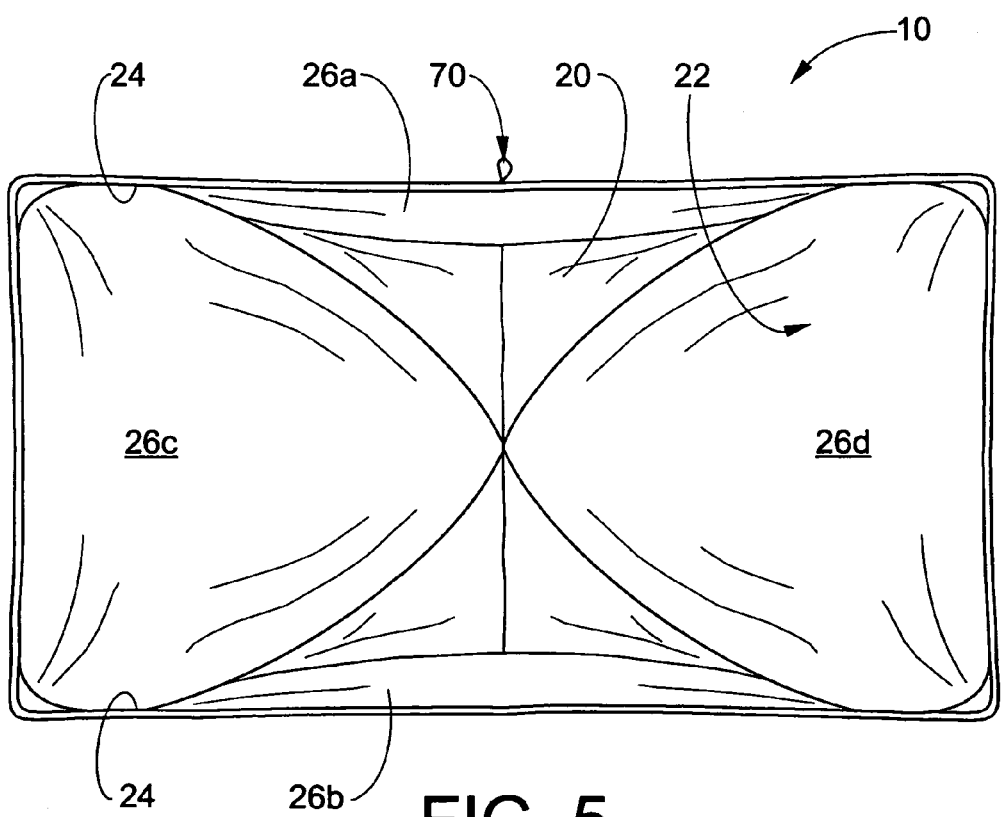
FIG. 5 is a bottom plan view of the spring-loaded folding grill cover device shown in FIG. 1.

The flexible cover 20, when in an expanded condition as shown in FIGS. 1–5, defines a hollow recess 22 having a mouth 24 (see bottom view in FIG. 5). As shown in FIG. 1, an associated grill G is received in the recess 22 via mouth 24 so that the flexible cover 20 defines a shell over the associated grill G being covered. In the illustrated preferred embodiment, the flexible cover 20 comprises like front and rear panels 26a,26b and like left and right side panels 26c,26d that all cooperate to define the flexible cover 20 defining the recess 22 and mouth 24.

The flexible cover 20 further comprises a frame-holding portion 30. In the illustrated embodiment, the frame-holding portion 30 comprises an elongated at least substantially enclosed channel 32. As shown herein, the channel 32 includes multiple sections 32a,32b,32c,32d separated by openings 34a,34b,34c. The channel sections 32a,32b,32c,32d extend at least partially along or lie adjacent the seams defined between joined sections 26a,26b,26c,26d of the flexible cover 20. Of course, the channel 32 can be defined as a single, continuous channel. Also, the frame holding portion 30, such as the channel 32, can be located external of the recess 22 as shown herein, inside the recess 22 or hidden within the sections 26a–26d.

Figure 6:
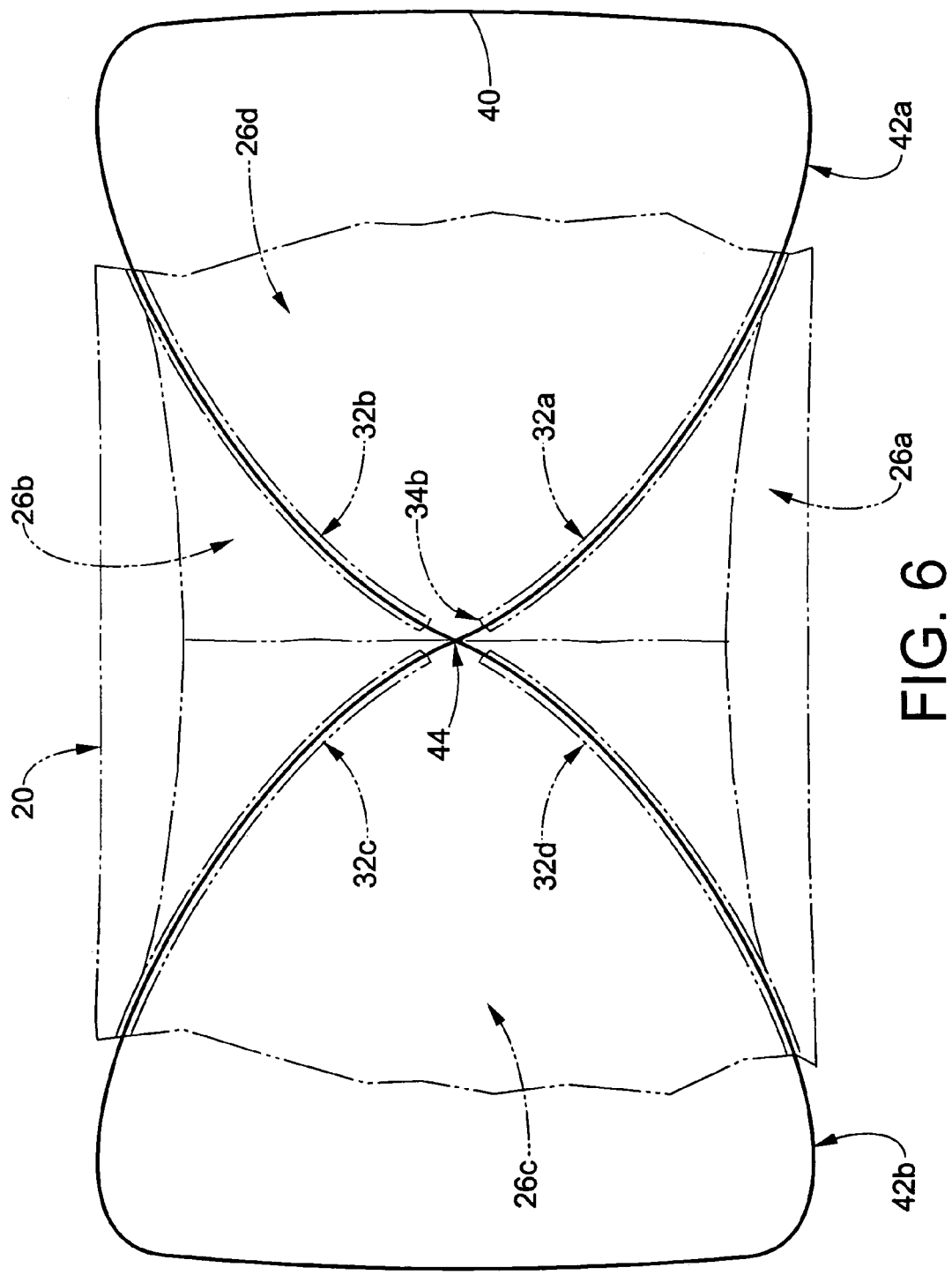
FIG. 6 is a top plan view similar to FIG. 4, but showing the flexible cover partially broken away and in phantom lines to illustrate the frame of the spring-loaded folding grill cover device shown in FIG. 1.

The spring-loaded folding grill cover device 10 further comprises a resilient frame 40 (see FIG. 6) connected to said flexible cover 20 by the frame-holding portion 30. In the illustrated embodiment, the resilient frame 40 is located in and extends coextensively with the channel 32 (the frame 40 is visible at the channel openings 34a–34c). The frame 40 is preferably defined by an elongated flexible and resilient frame member formed into a generally bow-tie or figure-8 shape, i.e., a closed shape defined by first and second loop portions 42a,42b interconnected by a central X-shaped joint portion 44.

In one embodiment as illustrated herein, the frame 40 is manufactured using an elongated length of frame material having opposite first and second ends. The length of frame material is fed into the channel 32 by inserting the first end of the frame element into a starting one of the openings 34a–34c. The frame material is then fed once completely through all sections 32a–32d of the channel 32 until the first end returns to the starting opening 34a–34c. The first and second ends of the frame element are then joined together at the starting opening 34a–34c using a clamp, adhesive, welding, mechanical inter-fit or any other suitable means.

In an alternative embodiment, the frame 40 is defined by forming the frame element into a closed loop structure that is then twisted to form a figure-8 shape. In this case, the pre-formed figure-8 shaped frame element is sewn or otherwise attached to the flexible cover 20.

The frame 40 is preferably defined from a flexible resilient frame material such as spring-steel (e.g., rod or tubing), a polymeric extrusion such as a plastic rod or tube, a fiberglass rod or tube, a composite rod or tube, or any other suitable resilient frame element. In one preferred embodiment, the frame element 40 is defined from a length of fiberglass-reinforced Nylon rod available commercially from Glastic Corporation, Cleveland, Ohio 44121.

The frame 40 resiliently biases and holds the flexible cover 20 into an expanded configuration where the recess 22 and mouth 24 defined by the flexible cover 20 are open and adapted for receipt of a grill G therein by placement of the device 10 over the grill as shown in FIG. 1. When the frame 40 biases the flexible cover into the expanded configuration, the cover sections 26a,26b,26c,26d are stretched tight so that folds and pockets are not created in the flexible cover as could collect water, dirt and the like.

Figure 7A:
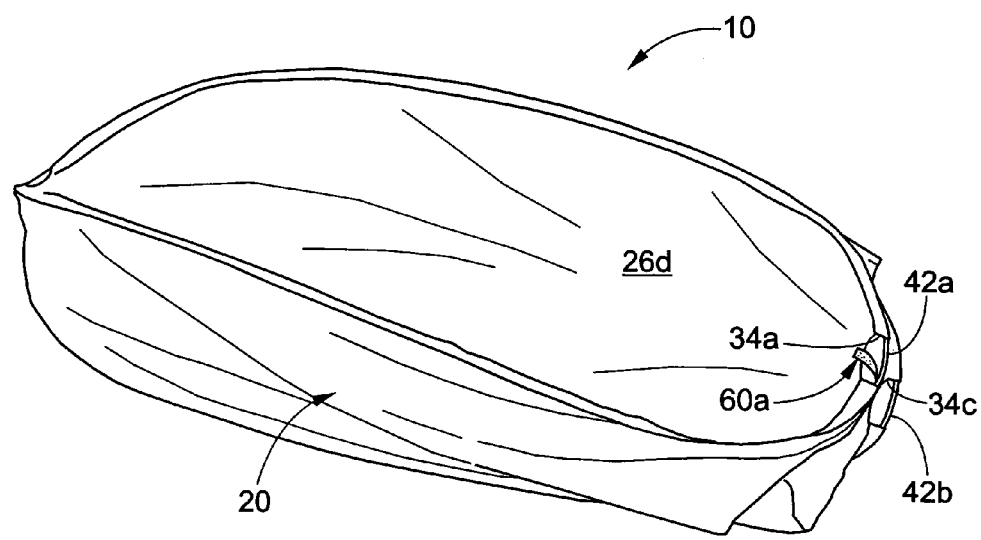
FIGS. 7A–7D illustrate step-by-step manual movement of the spring-loaded folding grill cover device of FIG. 1 from a first, expanded (operative) configuration as shown in FIG. 1 to collapsed (inoperative or storage) configuration as shown in FIG. 7D.
Figure 7B:
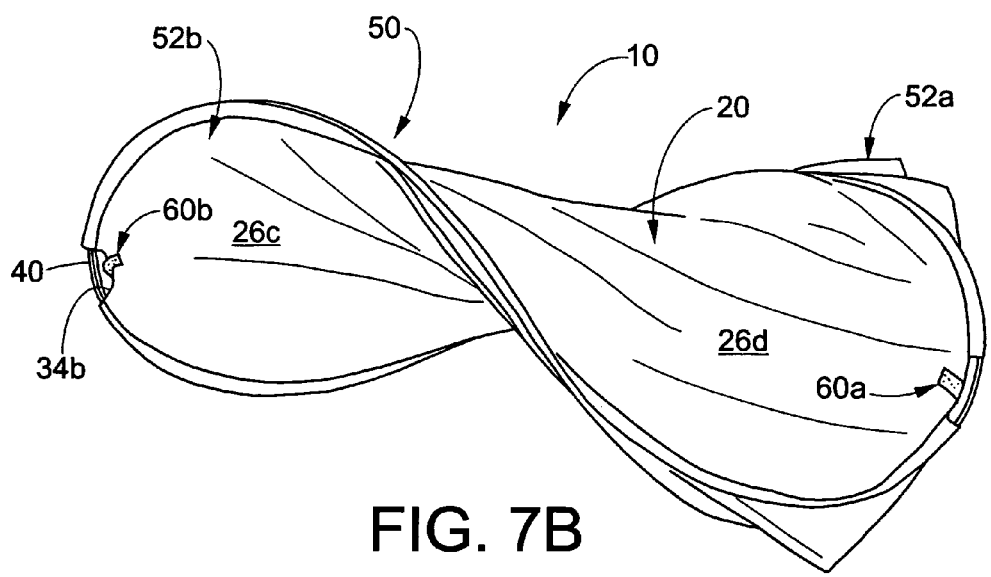
Figure 7C:
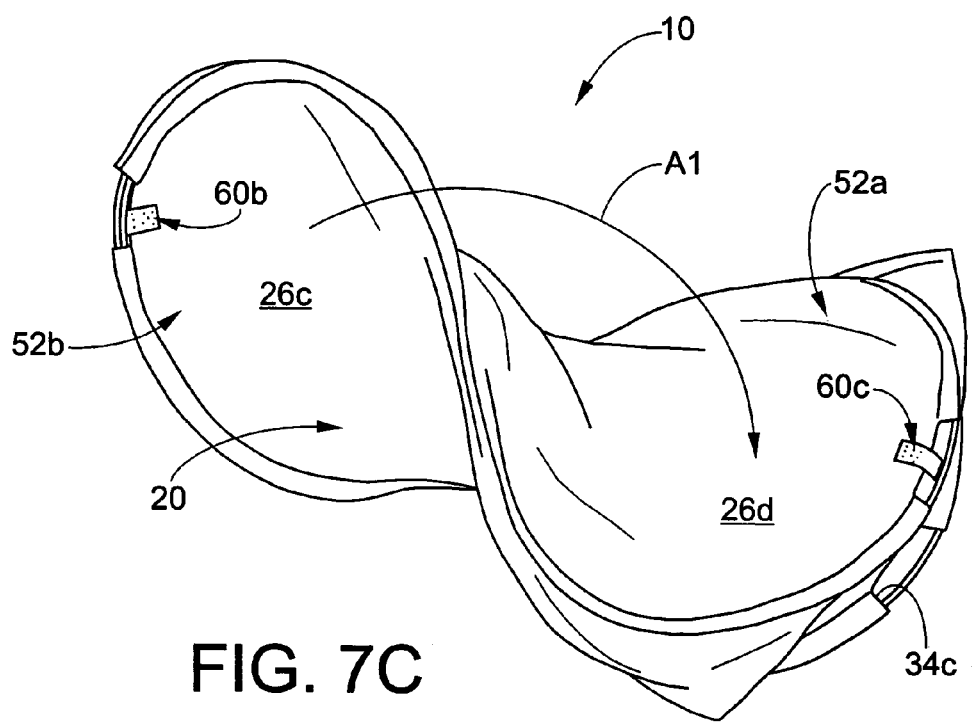
Figure 7D:
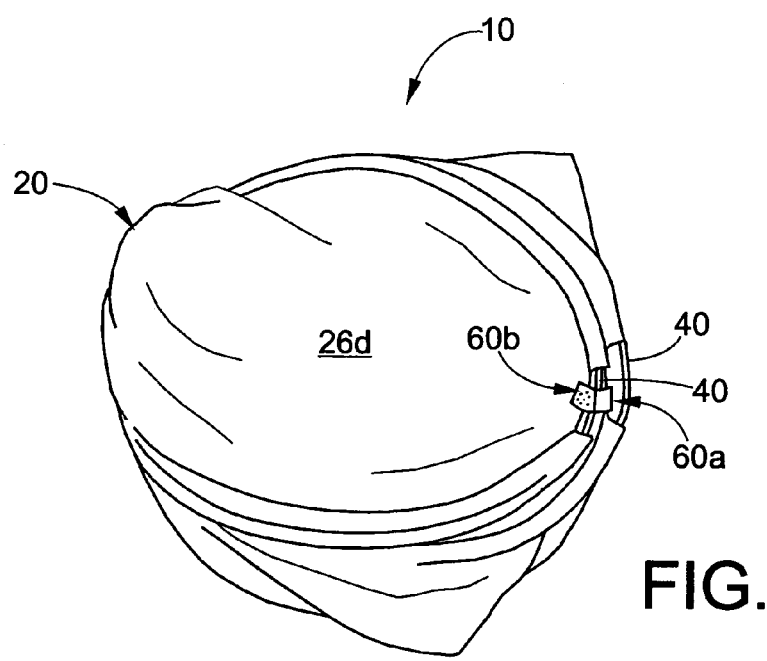

The frame 40 and flexible cover 20 are manually movable as a unit from the expanded configuration (FIGS. 1–5) into a collapsed storage configuration (FIG. 7D) through a step-by-step process. With reference to FIGS. 7A–7D, in a first step the first and second loop portions 42a,42b are moved adjacent or into abutment with each other as shown in FIG. 7A. The first and second abutted loop portions 42a,42b are twisted from the position shown in FIG. 7A about a longitudinal axis into a figure 8 shape 50 having a first and second portions 52a,52b as shown in FIG. 7B. As indicated by the arrow A1 in FIG. 7C, the first and second figure-8 portions 52a,52b are next folded together upon themselves so that the frame 40 defines a stacked plurality of four rings as shown in FIG. 7D. When the frame 40 defines the stacked plurality of four rings as shown in FIG. 7D, the frame 40 and attached flexible cover 20 define a compact disc-like shape. During the above-noted collapsing process, the flexible cover 20 moves with the frame.

When the frame 40 and cover 20 are moved to the collapsed configuration as shown in FIG. 7D, the frame 40 and cover 20 will automatically unfold and move to the expanded configuration unless restrained in the collapsed configuration. Thus, the device 10 comprises at least one fastening element for retaining the device in the collapsed configuration. In the illustrated embodiment, one or more straps including hook-and-loop fastening elements 60a,60b or the like are connected to the device 10 and are selectively engaged to hold the device 10 in the collapsed configuration. Alternatively, a carrying/storage case can be used to hold the device 10 in its collapsed configuration.

The mouth 24 of the flexible cover 20 preferably comprises a drawstring closure element 70 that is selectively engaged to restrict the mouth 24 when the cover device 10 is operatively installed on an associated grill G. By restricting the mouth 24, the drawstring closure element 70 inhibits separation of the device 10 from an associated grill G due to wind. The drawstring closure element 70 also further tensions the flexible cover 20 to inhibit formation of undesired pockets or creases.

The invention has been described with reference to preferred embodiments. Modifications and alterations will occur to those of ordinary skill in the art to which the invention pertains, and it is intended that the appended claims be construed as encompassing all such modifications and alterations.

Having thus described the preferred embodiments, what is claimed is:

1. A grill cover device comprising:

a flexible cover defining a hollow recess having an open mouth, said recess adapted to receive an associated grill therein when said flexible cover is in an expanded condition;

a flexible resilient frame connected to said flexible cover, said frame comprising a one-piece elongated frame member having opposite first and second ends that are connected relative to each other, said frame exerting a biasing force on said flexible cover to bias said flexible cover into said expanded condition, said frame and said flexible cover selectively resiliently deformable as a unit against said biasing force of said frame into a collapsed storage configuration in which said frame and cover are folded upon themselves so that said frame defines four rings arranged in a stacked configuration, said frame, in said expanded configuration, defining first and second loops interconnected by an x-shaped portion;

at least one fastening element for releasably restraining said frame and said cover in said collapsed storage condition;

a drawstring closure element for selectively constricting said open mouth of said recess; and, wherein said flexible cover defines a channel having multiple sections separated from each other by openings, and wherein said frame extends through all of the sections of said channel and is exposed at said openings, each of said openings providing a location for feeding said frame into said channel.

* * * * *